Figure 1:
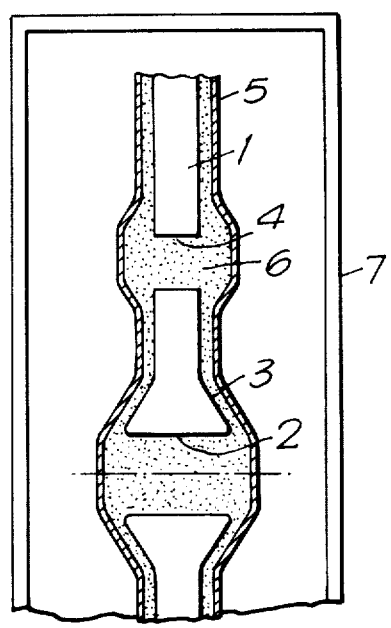

United States Patent [19]

Conolly

[11] Patent Number: 4,492,737
[45] Date of Patent: Jan. 8, 1985

[54] COMPOSITE METALLIC AND NON-METALLIC ARTICLES

[75] Inventor: Ralph I. Conolly, Bristol, England

[73] Assignee: Rolls-Royce Limited, England

[21] Appl. No.: 472,032

[22] Filed: Mar. 4, 1983

[30] Foreign Application Priority Data

Mar. 5, 1982 [GB] United Kingdom ............... 8206583

[51] Int. Cl.³ .................. B22F 7/06; B22F 5/04; F23C 11/00
[52] U.S. Cl. .................. 428/552; 416/241 R; 416/241 B; 416/229 R; 29/156.8 R; 29/235; 60/753; 51/307; 51/309; 419/8; 419/13; 419/28; 419/49; 419/10
[58] Field of Search .................. 419/5, 6, 8, 7, 13, 419/26, 28, 15, 10, 49, 38, 19; 428/552; 416/241 R, 241 B, 229 R; 29/156.8 R, 23.5; 51/307, 309; 60/753

[56] References Cited

U.S. PATENT DOCUMENTS

| | | | |
|---|---|---|---|
| 2,267,954 | 12/1941 | Schumacher | 428/552 X |
| 4,063,939 | 12/1977 | Weaver et al. | 419/5 |
| 4,097,276 | 6/1978 | Six | 419/8 |
| 4,137,619 | 2/1979 | Beltran et al. | 419/49 X |
| 4,214,906 | 7/1980 | Langer et al. | 419/49 X |
| 4,293,619 | 10/1981 | Landingham et al. | 419/8 |
| 4,314,007 | 2/1982 | Gessinger | 29/156.8 H X |
| 4,362,471 | 12/1982 | Langer et al. | 416/241 B |

FOREIGN PATENT DOCUMENTS

| | | | |
|---|---|---|---|
| 2456435 | 8/1976 | Fed. Rep. of Germany | 428/552 |
| 1321788 | 5/1962 | France | 428/552 |
| 1908 | 1/1975 | Japan | |
| 62103 | 5/1980 | Japan | 419/8 |
| 1012162 | 12/1965 | United Kingdom | |
| 1488762 | 10/1977 | United Kingdom | |
| 1490773 | 11/1977 | United Kingdom | |
| 1588920 | 4/1981 | United Kingdom | |

OTHER PUBLICATIONS

"Isostatic Pressing by the Quintus ® Process" by W. Mindrup and D. Ermel in the *Keramische Zeitschrift*, 1971, 23 (9) 510–514.

*Primary Examiner*—Ben R. Padgett
*Assistant Examiner*—Matthew A. Thexton
*Attorney, Agent, or Firm*—Parkhurst & Oliff

[57] ABSTRACT

The invention is concerned with the problem of joining ceramic components to metal components.

A composite ceramic-metal component is proposed, e.g. a rotor disc for a gas turbine engine (see FIG. 2), in which the main body of the component is made from a ceramic, e.g. Silicon Nitride, but the areas at which attachment is to be made to a metal component is formed from metal compacted onto the ceramic by a hot isostatic pressing process.

The method of manufacture described is to form a ceramic core with holes appropriately positioned in it where a connection is to be made to another component, surround the core with a powdered metal, e.g. a Nickel-based superalloy, ensuring that the holes also fill with powder, compacting the powder by hot isostatic pressing, and then machining away unwanted metal.

20 Claims, 4 Drawing Figures

U.S. Patent  Jan. 8, 1985  4,492,737

COMPOSITE METALLIC AND NON-METALLIC ARTICLES

The present invention relates to composite ceramic-metal components for example, for use in gas turbine engines.

It has long been recognised that ceramic components, for example, aerofoil blades and rotors in gas turbine engines, have a higher temperature capability than many of the present day superalloys. The problem in using ceramics, however, is their brittleness which, combined with their low co-efficient of thermal expansion, can lead to failure if they are connected directly to metal structure of the engine.

Previous attempts to solve this problem have centred around providing resilience in the support between the metal and the ceramic, but there is still no widespread use of these materials in gas turbine engines.

It is an object of the present invention to provide a composite ceramic-metal component which overcomes the above stated problem.

According to the present invention a composite component comprises a main ceramic or non-metallic composite load-bearing body to which is connected a metallic part adapted for connection to further metal structure the connection being achieved by hot isostatically pressing a metal in powder form onto at least a selected area of the ceramic or composite body.

According to a feature of the present invention, a method of making a composite ceramic-metal component comprises the steps of making a main ceramic load-bearing body, surrounding exposed surfaces of the ceramic body with a metal powder, compacting the powder onto the ceramic body by a hot isostatic pressing method and subsequently removing the metal from selected areas of the ceramic body.

The non-metallic composite material which may be used as an alternative to a pure ceramic, may be a carbon-in-carbon composite or a high temperature glass/ceramic composite.

The removal of metal may be by any suitable method, for example, chemical etching, electro-chemical machining or mechanical machining.

Examples of composite ceramic-metal components made in accordance with the present invention are rotor blades, rotor discs, and flame tubes for gas turbine engines.

Various ceramic-metal combinations may be used, one example being Silicon Nitride with one of the Nickel-based superalloys conventionally used in these components.

Figure 2:
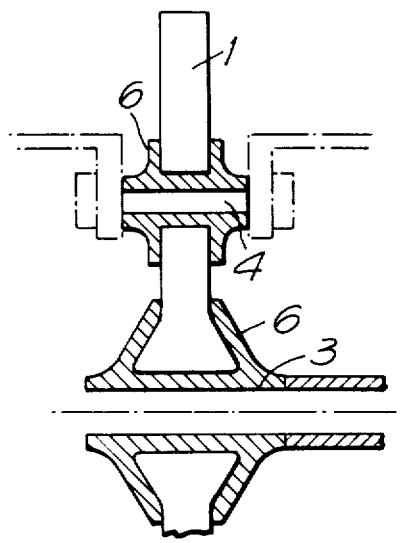
Figure 3:
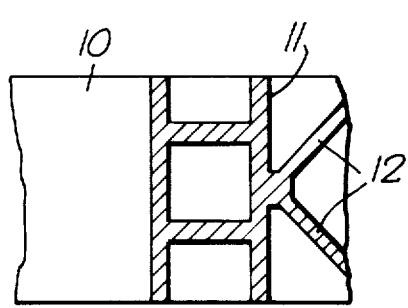
Figure 4:
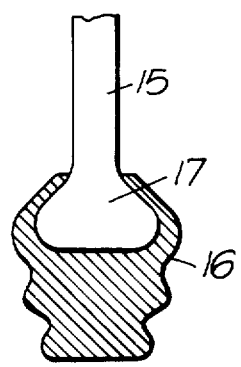

The invention will now be more particularly described with reference to the accompanying drawings in which:

FIG. 1 illustrates a ceramic rotor disc surrounded by a powdered metal in a hot isostatic environment in accordance with the present invention, FIG. 2 shows the disc of FIG. 1 after selective machining back of the metal re-inforcement, FIG. 3 shows a ceramic flame tube with selective metal re-inforcement made in accordance with the present invention, and, FIG. 4 shows a composite aerofoil blade made in accordance with the present invention.

Referring now to FIG. 1 of the drawings, a rotor disc for a gas turbine engine comprises a main load-bearing body 1 made from a ceramic material and having a central bore 2 therethrough. The radially inner region 3 of the disc around the bore is flared transversely to produce a dovetail effect. Further holes 4 are provided at spaced intervals around the disc which are to be filled with metal which can subsequently be drilled to provide bolt holes.

The disc is placed in a "can" 5 which is filled with powder 6 of an appropriate superalloy material ensuring that the holes 4 and the bore become filled with powder. In order to locate and support the ceramic body during the rest of the manufacturing process, at least some parts of the powder material may be pre-pressed into an intermediate form having intermediate or green strength.

The "can" 5, which may be made from glass, ceramic or metal, is closed by a close fitting lid and is evacuated and sealed. The sealed can is then placed in a hot isostatic environment in a closed vessel 7 at temperatures in excess of 800° C. and pressures up to 25 ksi and the powder metal is compacted and bonded to the ceramic.

When removed from the "can" the ceramic body is completely coated with a metal skin including the bore 3 and the holes 4.

Subsequently unwanted metal is removed to leave the metal re-inforcement only in the required places so that metal-to-metal joints can be made with adjacent metal structure to which the disc must be joined.

Clearly the powder may be compacted onto selected areas as an alternative to completely surrounding the core with unwanted metal.

As can be seen in FIG. 2 the holes 4 can be drilled to receive standard bolts for bolting on a flanged spacer, shown only in ghost outline, to connect the disc to an adjacent disc. Similarly the metalled bore 3 can be attached directly to a shaft for driving the disc.

By suitably shaping the "can" in which the hot isostatic pressing operation is carried out the shapes of metal flanges can be established on the disc exterior.

The same technique may be used to provide metal re-inforcement of ceramic components. FIG. 3 shows a flame tube 10 made by the same process in which the complete ceramic article is first totally encased in metal powder which is compacted on by hot isostatic pressing, and then machined back to leave a skeletal structure of supporting ribs 11,12.

FIG. 4 shows an aerofoil blade having a ceramic aerofoil portion 15 and a composite ceramic-metal root. The blade is made by encasing a pre-formed ceramic core in a powdered metal, compacting the metal onto the ceramic by a hot isostatic pressing process as described above in relation to the disc, and subsequently machining the metal away from the aerofoil surfaces of the blade.

The material combinations chosen will depend on the article, and the environment in which it has to operate. For example, ceramic part may be formed from Silicon Nitride while the metal powder may be one of the Nickel based superalloy materials presently used for example, an alloy sold under the trade name IN 100 by the International Nickel Company.

In the flame tube application it is important that a good bond is formed between the ceramic and the metal strengthening ribs, and the co-efficients of thermal expansion of the ceramic and metal must be matched fairly carefully, or an intermediate layer may be used between them and which has an intermediate co-efficient of thermal expansion.

In the blade and disc applications, however, it may not be necessary to have a good bond between the metal and the ceramic because the ceramic and metal parts are mechanically locked together.

One of the benefits of the above-described method of manufacture of the composite articles is that the metal and ceramic are compacted at a high temperature which is near the working temperature of the article. Thus the expansions of the two components will be matched at that temperature during operation when the articles are highly stressed. The mis-match in expansions only becomes evident as the articles cool down after operation when there will be no externally applied stress to add to the stress induced by the mis-match.

Alternative materials to pure ceramics mentioned above are high temperature glass/ceramic composites such as Cordierite mixed with ceramic, or carbon-in-carbon composites.

I claim:

1. A method for manufacturing a composite component having a pre-formed body made from a base material chosen from the group consisting of a ceramic, a high temperature glass/ceramic composite and a carbon-in-carbon composite, and a metallic component bonded to a selected area on the pre-formed body, comprising the steps of:
   placing the pre-formed body in a peripherally walled can, with the pre-formed body spaced throughout substantially its entire extent, from the can wall, to define a space therebetween;
   filling the space between the pre-formed body and the can wall with a powdered metal, thereby completely surrounding the pre-formed body with the powdered metal;
   sealing and evacuating the can;
   applying hot isostatic pressure to the can to compact and sinter the metal powder and to bond the metal powder to the pre-formed body;
   removing the can from the exterior of the completely coated body; and
   removing the bonded metal powder from selected areas on the surface of the pre-formed body to expose areas of the base material and to leave the bonded metal powder at other areas, whereby the composite component can be directly connected to another metal component through a portion of the bonded metal powder.

2. The method of claim 1, wherein the can comprises a material chosen from the group consisting of glass, ceramic and metal.

3. The method of claim 1, wherein the applied temperature during hot isostatic pressing is in excess of 800° C.

4. The method of claim 1, wherein the applied pressure is limited to 25 ksi.

5. The method of claim 1, wherein the powdered metal is a nickel-based super alloy.

6. The method of claim 1, wherein the ceramic pre-formed body consists of SiN.

7. The method of claim 1, wherein the bonded metal powder is removed from the surface of the pre-formed body by chemical etching.

8. The method of claim 1, wherein the bonded metal powder is removed from the surface of the pre-formed body by electro-chemical machining.

9. The method of claim 1, wherein the pre-formed body is a non-continuous body and the powdered metal fills in the space between the non-continuous portions of the pre-formed body.

10. The method of claim 1, wherein a portion of the metal powder is pre-pressed into an intermediate form thereby imparting green strength and functions as a partial positioner of the pre-formed body within the can.

11. The method of claim 1, wherein the composite component comprises an integral hub portion and blade portion for a turbine wheel, whereby the method further comprises manufacturing a plurality of integral hub portions and blade portions and after removing the bonded metal powder from selected areas on the surface of the integral hub and blade portions, said other areas of the bonded metal powder are mechanically fixed to said another metal component to form a turbine wheel.

12. The method of claim 1, wherein the composite component comprises an integral blade portion and root portion for a rotor turbine, whereby the method further comprises manufacturing a plurality of integral blade and root portions and after removing the bonded metal powder from selected areas on the surface of the individual blade and root portions, said other areas of the bonded metal powder are mechanically fixed to said another metal component to form a rotor turbine.

13. The method of claim 1, wherein the composite component comprises a flame tube, whereby said other areas of the bonded metal powder comprise supporting ribs which effectively strengthen the pre-formed body portion.

14. The method of claim 1, wherein the bonded metal powder is removed from the surface of the pre-formed body by mechanical machining.

15. The method of claim 14, wherein holes are mechanically machined through portions of the bonded metal powder allowing for a means for directly anchoring the bonded metal powder portion to said another metal component.

16. The method of claim 15, wherein a portion of the metal powder is pre-pressed into an intermediate form thereby imparting green strength and functions as a partial positioner of the pre-formed body within the can.

17. A composite component comprising a pre-formed body made from a base material chosen from the group consisting of a ceramic, a high temperature glass/ceramic composite and a carbon-in-carbon composite and a metallic component bonded to a selected area upon the pre-formed body, the method for making the composite component comprising:
   placing the pre-formed body in a peripherally walled can, with the pre-formed body spaced throughout its entire extent, from the can wall, to define a space therebetween;
   filling the space between the pre-formed body and the can wall with a powdered metal, thereby completely surrounding the pre-formed body with the powdered metal;
   sealing and evacuating the can;
   applying hot isostatic pressure to the can to compact and sinter the metal powder, and to bond the metal powder to the pre-formed body;
   removing the can from the exterior of the completely coated body; and
   removing the bonded metal powder from selected areas on the surface of the pre-formed body to expose areas of the base material and to leave the bonded metal powder at other areas, whereby the composite component can be directly connected to another metal component through a portion of the bonded metal powder.

18. The composite component of claim 17, wherein the composite component comprises an integral hub portion and blade portion for a turbine wheel, portions of said other areas of bonded metal powder having holes drilled therethrough for receiving metal portions which are fixed to said another metal component, the turbine wheel comprising a plurality of integral hub portions and blade portions.

19. The composite component of claim 17, wherein the composite component comprises an integral aerofoil blade portion and root portion for a rotor turbine, the rotor turbine comprising a plurality of integral blade portions and root portions.

20. The composite component of claim 17, wherein the composite component comprises a flame tube, said other areas of the bonded metal powder comprise supporting ribs which effectively strengthen the preformed body portion.

* * * * *